United States Patent
Hebenstreit

(10) Patent No.: US 7,154,055 B2
(45) Date of Patent: Dec. 26, 2006

(54) METHOD AND APPARATUS FOR DIVIDING PORTIONS

(75) Inventor: Paul Hebenstreit, St. Louis, MO (US)

(73) Assignee: Bakery Systems, Inc., St. Louis, MO (US)

( * ) Notice: Subject to any disclaimer, the term of this patent is extended or adjusted under 35 U.S.C. 154(b) by 183 days.

(21) Appl. No.: 10/795,468

(22) Filed: Mar. 8, 2004

(65) Prior Publication Data

US 2005/0194193 A1 Sep. 8, 2005

(51) Int. Cl.
G01G 13/02 (2006.01)
A21D 6/00 (2006.01)

(52) U.S. Cl. ............................ 177/83; 177/84; 177/105; 177/108; 177/145; 425/140; 425/148; 426/231; 426/503; 426/518

(58) Field of Classification Search ................ 425/140, 425/148; 177/83–88, 105–113, 145; 426/231, 426/518, 503
See application file for complete search history.

(56) References Cited

U.S. PATENT DOCUMENTS

| | | | |
|---|---|---|---|
| 3,997,013 | A | 12/1976 | Brook |
| 4,163,488 | A | 8/1979 | Brook |
| 4,420,051 | A | 12/1983 | Furuta et al. |
| 4,494,582 | A * | 1/1985 | Meyer ............................ 141/9 |
| 4,967,857 | A | 11/1990 | Kent et al. |
| 5,046,570 | A * | 9/1991 | Emme et al. ................ 177/145 |
| 5,106,636 | A * | 4/1992 | Ban et al. ..................... 426/231 |
| 5,150,758 | A * | 9/1992 | Gmuer ......................... 177/84 |
| 5,232,713 | A * | 8/1993 | Morikawa et al. ........... 425/140 |
| 5,244,100 | A | 9/1993 | Regier et al. |
| 5,292,539 | A * | 3/1994 | Tashiro et al. .............. 426/231 |
| 5,723,824 | A | 3/1998 | Stadler |
| 6,073,667 | A | 6/2000 | Graffin |
| 6,441,321 | B1 * | 8/2002 | Hebenstreit ................... 177/50 |
| 6,468,570 | B1 * | 10/2002 | Haddad et al. .............. 426/231 |
| 6,511,689 | B1 * | 1/2003 | Lowry et al. ................ 426/231 |
| 6,521,847 | B1 | 2/2003 | Ostermann |
| 2005/0167163 | A1 * | 8/2005 | Hebenstreit |

* cited by examiner

Primary Examiner—Randy W. Gibson
(74) Attorney, Agent, or Firm—Bryan Cave, LLP

(57) ABSTRACT

An apparatus and method for continuously producing constant weight portions of semi-solid matter, such as bread dough, from a large mass through a dividing mechanism whereby portions are formed on a receptacle which receives the portion so that an accurate weight indication of the portion can be taken. By separating portions of the mass with the divider, when the weight of the mass on the receptacle reaches a predetermined shutoff weight, constant weight portions are achieved. A drive motor may power the receptacle through a selectively disengageable motor drive connection, which can be disengaged to allow accurate weight indications. Variations in the weight of portions from a target portion weight may be minimized by automatically adjusting the shutoff weight at which the portion is separated by the dividing mechanism, according to the difference between the portion weight and the target weight.

22 Claims, 5 Drawing Sheets

METHOD AND APPARATUS FOR DIVIDING PORTIONS

FIELD OF THE INVENTION

The described invention relates to an apparatus and method for continuously producing constant weight portions of semi-solid matter, such as bread dough, from a large mass through a dividing mechanism at high production rates, and more particularly, to such apparatus and method whereby variations in the weight of each portion are minimized by automatically controlling the operation of the dividing mechanism.

BACKGROUND OF THE INVENTION

Commercial dough production often involves production of large quantities of dough which are continuously divided into portions using various types of dividing mechanisms, such as a rotating knife or ram shear divider, into which dough is fed by motor driven dough feeding devices such as machine extruders, augers or pumps. In the case of dividing mechanisms which divide dough passing through the mechanism at a fixed interval, such as a rotating knife or ram shear divider, control of the portion size and therefore weight is achieved by controlling the operating rate of the dividing mechanism by varying the frequency or speed of the motor driving the dough feeding device, such as an electrical motor powered auger or pump. Weight control of divided dough portions has been carried out by varying control inputs to feeding device motors through the use of in-motion conveyor type checkweighing systems, such as weigh belts and weigh belt feeder systems. These apparatus, however are only capable of determining a projection of the actual static weight by collecting samples of output from a weight sensor as individual dough portions as well as the section of the conveyor belt supporting the portions pass over it. Also, as the weight samples are collected, the sensor accuracy can be affected by air currents, vibration from surrounding equipment, vibrations or harmonics generated by the dough portion's movement on the conveyor and other physical effects.

Also, since it is necessary to use a weighing device with sufficient capacity to support the weight of the empty conveyor along with the weight of the dough portion to be weighed, larger capacity weight sensors must be used, which are much less sensitive than smaller weighing sensors of the same variety.

Additionally, due to the physical properties of extruded dough, it tends to adhere to any surface it contacts. To limit the amount of adhesion it is common for flour to be sifted onto the device transporting dough portions. In prolonged operation, flour may randomly accumulate in various locations along the transport mechanism, including in the area where weight measurements are taken, thus introducing errors in the weight indications.

Further, due to the semi-solid nature of raw dough, transporting dough portions by a belt conveyor requires that the plane of the initial conveyor belt be at a higher elevation than subsequent downstream conveyor belts to eliminate the possibility of the dough portion being forced downward through the transition between sets of conveyor rollers. Also, in a system employing an in-motion belt weighing mechanism, the abrupt transition of the dough portion from an upstream conveyor to the weighing conveyor can impart an impact or torsion force to the weight sensor, resulting in inaccuracies in the measured weight.

Additionally, there are physical constraints with in-motion weighing systems, including that the weighing conveyor must be of substantial length, generally at least thirty inches, which may create integration problems with existing equipment.

Another commonly used means of weighing divided dough portions involves the use of a static weigh scale, whereby an operator may randomly remove and weigh dough portions and perform a statistical calculation to determine what adjustment may be required. This method also has several disadvantages, including that substantial variations in any individual sample portions may unduly influence the adjustment, and that removal of sample portions from the processing sequence may affect production efficiency.

SUMMARY OF THE INVENTION

Thus, a need remains for a system to continuously monitor and control the weight of divided dough portions at high production rates without human intervention. Preferably, such a system would minimize the variations in the weight of dough portions from a desired weight by automatically calculating and implementing precise adjustments to the controller of the dough divider mechanism.

The present invention satisfies these needs and provides an apparatus and method for continuously controlling the weight of divided dough portions at high production speeds.

This invention comprises a method and apparatus for controlling the weight of portions of semi-solid portions, such as bread dough, at high rates of processing. In one embodiment, the apparatus comprises a dividing station having a weighing receptacle preferably comprising rollers coated with ultra high molecular weight plastic (UHMW) or other light weight, non-stick material. The rollers receive individual dough portions from an incoming feed system, supports them so that a combined weight indication of the portion and the receptacle can be taken to operate the dividers to produce a portion of desired weight, and then rotate to release the portion for further processing. The operation of the rollers may be controlled by a servo motor connected to the rollers by a selectively disengageable connection. When the weight indication reaches the predetermined shutoff level, the weight signal processor may transmit control signals to the divider to close to separate the dough portion and to the drive motor to rotate the drive roller to release the portion for further processing. The weight signal processor may also adjust the shutoff weight so that the actual Portionweight falls within predetermined tolerances. For example, if the actual Portionweight indication exceeds the tolerances, the weight signal processor may adjust the shutoff weight by the amount of the excess, or a pre-established proportion of the excess.

One embodiment of the present invention comprises a dough production and feed mechanism, a dividing station having a receptacle for receiving and weighing individual portions, a weight signal processor to calculate and transmit appropriate control signals to the dividing mechanism, a release mechanism for releasing the portion from the dividing station, and a conveyor system configured to transport dough portions from the dividing station for further processing.

The Dividing Station

The dividing station is preferably a freestanding device that can be positioned between the dough supply and a downstream processing or conveyor system. The dividing station preferably comprises a divider, at least one roller receptacle, a load cell, and an axle for mounting the roller to the load cell.

Divider

The divider is preferably a knife gate which opens and closes the flow of dough according to control signals received by the divider. As is apparent to one skilled in the art, various types of mechanisms can be used for the divider, including, for example, slide gates or other types of valves which operate by electrical, pneumatic or motor-driven means.

The Rollers

The rollers are configured to receive, support and release or propel a dough portion. The surface of the roller is preferably made of a light weight, non-stick material, such as ultra high molecular weight polyethylene ("UHMW") plastic. The roller is preferably mounted on an axle, which is supported by a frame resting on the load cell. The load cell thus provides an indication of the weight of the portion on the rollers due to the displacement of a resilient counter force from the combined weight of the portion and rollers, axle, and frame compared to the baseline load cell displacement from the empty rollers, axle and frame. This comparison is performed quickly and automatically by the weight signal processor.

The Motor Drive Connection

The motor drive connection allows the rotating receptacle on the dividing station to be controllably driven by the servo motor, with the capability to selectively and completely disengage during the weighing process, thus eliminating extraneous inputs to the load cell from contact with the drive motor. This is preferably accomplished by the use of selectivity interlocking driving portion and driven portion of the motor drive connection, such as a "fork" and "T" configuration. This configuration allows the two pegs or tines of the fork portion of the connection to contact the two arms of the T portion to drive the receptacle in the desired direction. In preparation for weighing, the weight signal processor sends a control signal to the motor so that the fork portion is briefly driven in the reverse direction, about 5 to 10 degrees, to provide sufficient clearance between the fork and T portions of the motor drive connection to prevent contact during the weighing operation. As is apparent to one skilled in the art, many possible configurations of a selectively disengageable connection are possible, such as a gear drive with sufficient clearance between the teeth of the adjacent gears to provide free play when the drive motor is reversed a small amount on the order of 1–10 degrees, or drive connections involving selectively axially, radially or laterally displacing elements, such as solenoid, pneumatic, hydraulic or other types of drive connections and clutches. Also, as is known in the art, the operation of such selectively disengageable connections may be controlled directly by signals transmitted by the weight signal processor, or indirectly by controlling the operation of the drive motor.

Once the weighing operation is complete, the weight signal processor can send a control signal to the drive motor to rotate the roller as appropriate to discharge the weighed portion, and so the roller is prepared to receive the next portion to be weighed. The fork and T configuration also provides angular, lateral, and/or axial displacement tolerances in the motor drive connection to accommodate moderate misalignment between the rotating receptacle drive mechanism and the shaft of the servo motor arising due to the movable nature of the dividing station supported by the load cell.

Servo Drive Motor

The servo drive motor is preferably a servo motor with a 16-bit digital controller, suitable for receiving control signals from the weight signal processor. The drive motor may drive one dividing station through a single motor drive connection, or multiple dividing stations through a gang drive mechanism, comprising a plurality of output shafts and motor drive connections driven by a single motor. Such gang drive mechanisms may, for example, comprise a series of 90° drives driven by the servo motor through an extended shaft located in proximity to each dividing station.

Load Cell

As the dough is fed through the divider, it is received by the rotating receptacle, preferably one or more rollers. The rollers are mounted on axles, which are supported by a load cell. The load cell provides an electrical indication of the displacement of a resilient counter force due to the weight of the portion, the rotating receptacle and the frame. Various types of counter forces, such as springs or elastomeric materials, can be used in the load cell. The displacement of the counter force can be measured by devices which exhibit varying electrical properties under physical deformation or displacement, such as strain gages, piezoelectric force transducers or force motors. The analog electrical indications generated by the load cell can be converted by an analog to digital converter ("A/D") to a digital signal compatible for further processing by the weight signal processor. The load cell of the dividing station may utilize a dampening mechanism, such as a load cell body or counter force that is submerged in an engineered high density fluid, to provide impact cushioning and limit the post impact oscillation ("ringing") of the counter force due to the impact of the dough portion on the receptacle.

Weight Signal Processor

The load cell weight indication is input into the weight signal processor for control of the divider and determination of the portion weight. The weight signal processor preferably comprises an A/D converter and a data processor with digital processing capability, such as a PC. The data processor is programmed to transmit a control signal to the servo motor to disengage the motor drive connection, so that an accurate weight indication of the dough mass supported by the rollers may be obtained by the data processor. Once the shutoff weight indication is detected, the data processor sends a control signal to the divider to close, thus separating the dough portion on the rollers from the dough in the supply line.

The weight signal processor also compares the final weight of each separated dough portion to the desired dough portion weight and automatically calculates an adjustment to the shutoff weight value used to control the divider to increase or decrease the amount of dough passing through the cutting mechanism during each dividing cycle, thereby providing continuous divided dough weight monitoring and control.

Alternatively, after the weight signal processor collects the electrical indications generated by the load cell for the portion and sends a control signal to operate the divider, the weight signal processor may analyze the data to determine if the static weight of the portion is within the predetermined tolerances. The weight signal processor may then store the weight data for multiple portions in electronic or other memory device, perform statistical analyses, and, if appropriate, provide corrective adjustments to shutoff weight value. This process is repeated for successive dough portions.

After weighing of a separated portion is complete, if the weight indication is within tolerances, the weight signal processor can input a control signal to the servo motor to transmit rotational force through the motor drive connection to rotate the roller, thus releasing the dough portion from between the rollers to an outbound conveyor system. Alternatively, if the weight indication is outside established tolerances: the weight signal processor can input a different control signal to the servo motor of the receptacle drive mechanism to transmit a rearward rotational force through the motor drive connection to rotate the roller in the rearward direction, thus propelling the dough portion to a reject conveyor or location for corrective processing.

In essence, in one embodiment, the present invention comprises a method of continuously dividing a mass of semisolid matter into a plurality of portions, each having a preselected target weight, comprising the steps of: 1) providing a dividing mechanism that divides the semi-solid matter into portions, the closing of the dividing mechanism controlled by inputting a control signal when a portion weight indication equal to the shutoff weight is detected; 2) inputting an initial shutoff weight value; 3) dividing portions of semi-solid matter using the shutoff weight value; 4) weighing each portion in a group containing a predetermined number of portions; 5) determining the average difference between the weight of each portion in the group and the predetermined target weight; and 6) adjusting the shutoff weight by the average weight difference multiplied by a predetermined moderating factor.

BRIEF DESCRIPTION OF THE DRAWINGS

The invention will now be further described in conjunction with the drawings, in which.

The drawings are provided for illustrative purposes only and should not be used to unduly limit the scope of the invention.

DETAILED DESCRIPTION OF A PREFERRED EMBODIMENT

Figure 1:
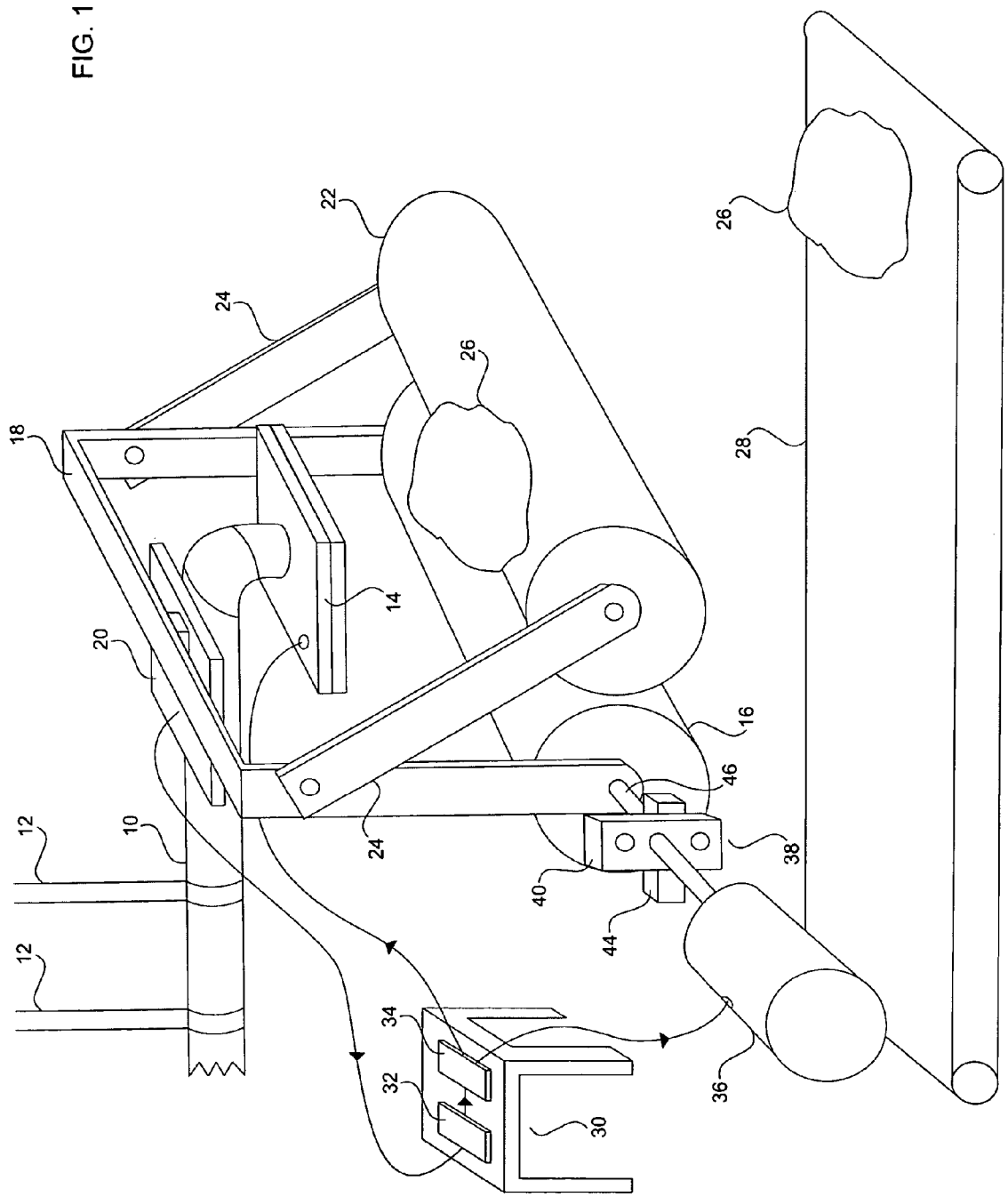
FIG. 1 is a diagram illustrating one preferred embodiment of the present invention.

FIG. 1 is an illustration of an apparatus for implementing the method of the present invention. A dough flow is produced by a dough production mechanism and fed by an extrusion device, such as intertwined helix augers, through a supply line to the divider station. As show in FIG. 1, the dividing station comprises a supply line 10 which is held in place by supports 12. The supply line feeds into divider 14 which controllably opens and closes the flow of dough to release portions of dough 26 onto drive roller 16. Roller 16 is mounted on axle 46 and suspended by frame 18. The roller 16 preferably has a surface of non-stick material such as Teflon® or ultrahigh molecular weight plastic. The frame 18 is mounted to a load cell 20, which comprises an element which produces varying electrical characteristics according to the applied load. The dough portions 26 released from the divider 14 are also received by free roller 22, which is rotatably mounted to roller arms 24, which arms are pivotally mounted to the frame 18. While the portion 26 is supported by the fixed roller 16 and the free roller 22, its weight can be determined from electrical indications transmitted from the load cell 20. The load cell indications transmitted by the load cell 20 are received and analyzed by the weight signal processor 30. The analog weight indications generated by the load cell 20 of the divider station are converted by A/D converter 32 of the weight signal processor 30 and input into the data processor 34.

The rotation of the drive roller 16 is controlled by a signal initiated by the data processor 34 of the weight signal processor 30 and sent to the drive motor 36. The drive motor 36 engages the drive roller 30 of the dividing station through the motor drive connection 38. As is generally understood in the art, this same method can alternatively be accomplished without the use of a drive motor to rotate the drive roller 16 to deposit the portion 26 on to the conveyor 28 by configuring the size and weigh of the rollers 16 and 22 to support the dough portion 26 until it approaches the shutoff weight. Once the shutoff weight of the portion 26 is reached, and the portion 26 is separated from the feed dough in the supply line 10 by the closing of the divider 14, the weight of the separated portion 26 is sufficient to cause the rollers to rotate and/or separate, and thus allow the portion to exit between the rollers 16 and 22 to the conveyor 28 below. Alternatively, the configuration of the rollers to selectively accommodate different weight can also be achieved by the use of frictional devices to controllably resist rotation of the rollers or the use of various types of tensioning devices between the rollers which may selectively resist separation of the rollers until the weight of the portion approaches the shutoff weight. As is generally known in the art, such tensioning devices can include springs, elastic or elastomeric devices and materials, counterweights and the like. Following the weighing operation, the dough portion 12 is propelled to a downstream conveyor 34 for further processing, by rotation of the rollers 16 and 22.

The data processor 34 is programmed to transmit a control signal to the servo motor 36 to disengage the motor drive connection 38 so that an accurate weight indication of the portion 26 may be obtained. Once the shutoff weight indication is detected by the data processor 34, the data processor 34 sends a control signal to the divider 14 to close, thus separating the dough portion 26 from the feed dough in the supply line 10. Also upon detecting the shutoff weight, the data processor 34 may verify that the final portion weight is acceptable by measuring a delay time following the closing of the divider 14, and then reading an indication of the portion weight, complete separation of the portion from the divider is assured. The data processor 34 may also transmit a control signal to the servo motor 36 to commence rotation of the drive roller 16 in a downward direction towards the free roller 22 so that the dough portion 26 can be released or propelled downwardly between the rollers to the conveyor 28 below for further processing.

Motor Drive

Figure 2:
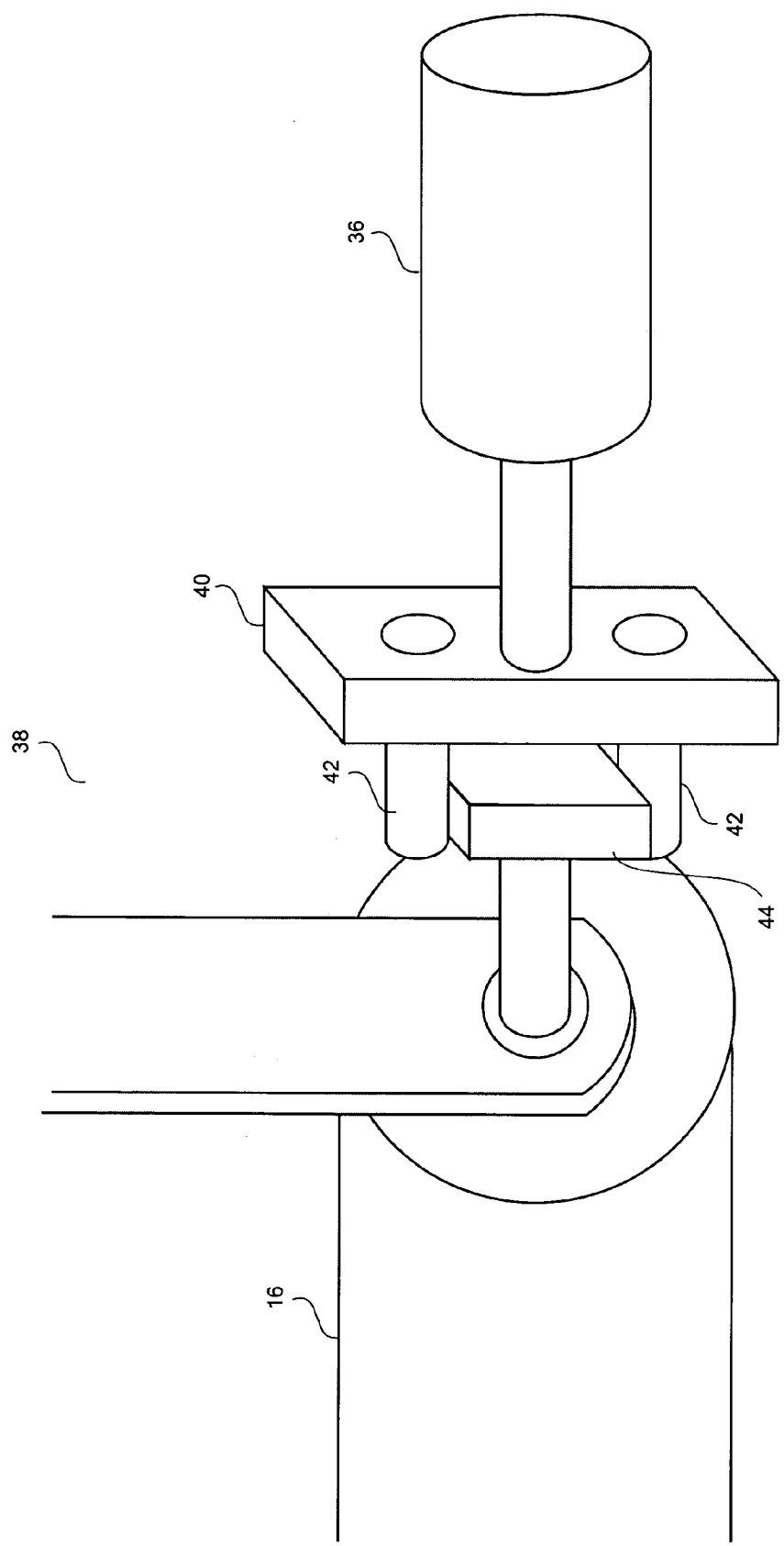
FIG. 2 is a diagram illustrating the motor drive connection of one preferred embodiment of the present invention.

As shown in FIG. 2, the rotating receptacle weighing apparatus is able to make accurate weight indications of the portion suspended on the rollers by isolating the drive roller 16 from the drive motor 36 which controls its rotational movement. This is accomplished by the incorporation of a motor drive connection 38 which can be selectively disengaged from the drive roller 16. This drive connection preferably comprises two mating components; a fork 40 with two or more pegs 42 on the driving side, and one or more blocks 44 on the driven side to transfer rational force for controllably driving the drive roller 16. By reversing the drive motor 36 a small amount, sufficient clearance is provided between the driving and the driven components such that the block 44 connected to the drive roller 16 is completely isolated from the pegs 42 connected to the drive motor 36. Accordingly, no force or resistance to movement will be applied to the drive roller 16, thus allowing an accurate weight measurement to be taken by the load cell 20 which supports the rotating rollers 16 and 22. As is apparent to one skilled in the art, many possible configurations of a drive connection are possible, including belts, pulleys, gears, and shafts, as well as incorporating portions of the motor drive connection 38 directly into the configuration of the drive roller 16.

Weight Signal Processor

Figure 3:
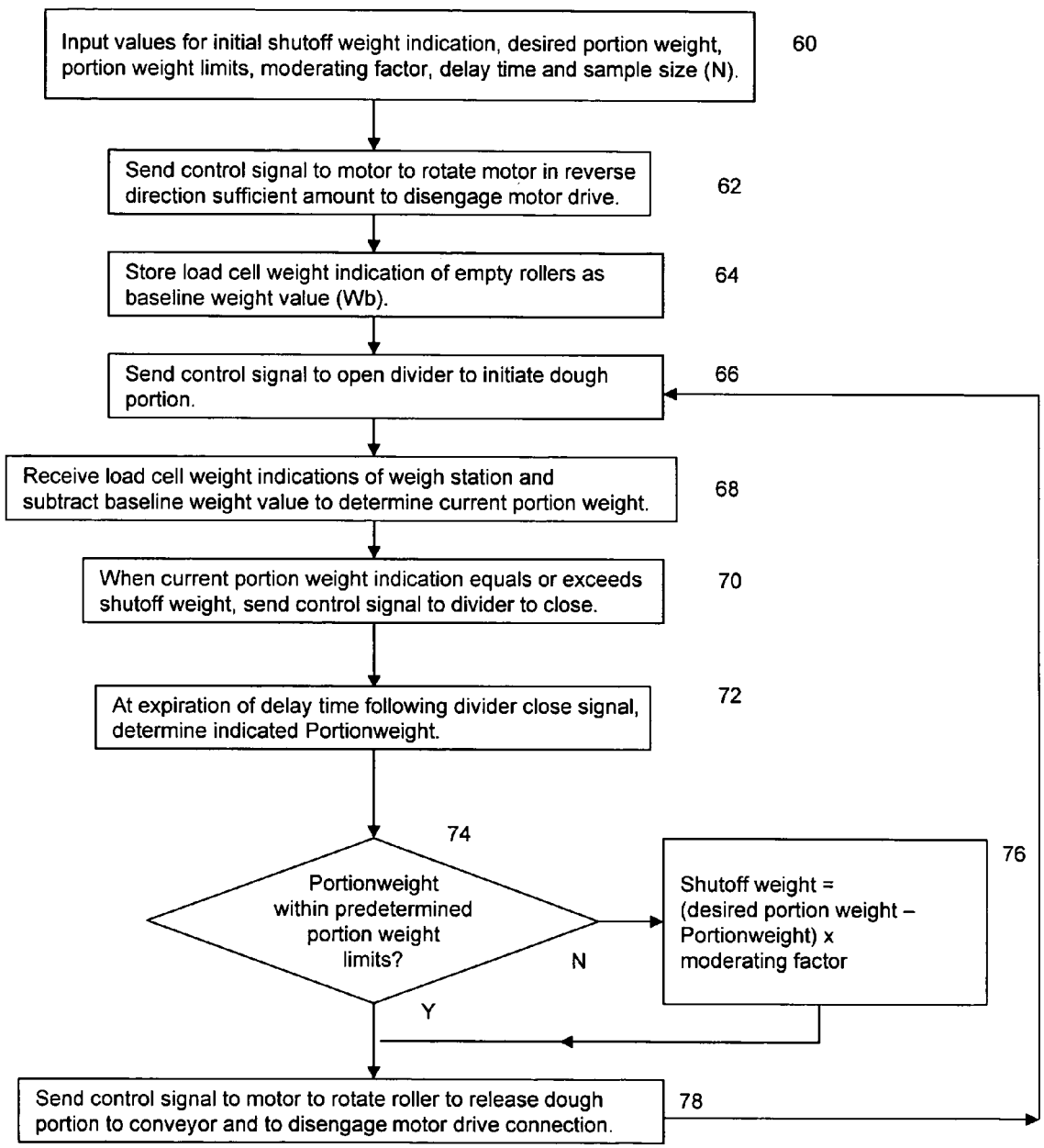
FIG. 3 is a flow chart diagram illustrating the operation of the weight signal processor of one preferred embodiment of the present invention.

As is known in the art, many types of data processing devices can be used for the data processor 34 of the weight signal processor 30, including personal computers ("PCs"). The operation of the weight signal processor 30 is further detailed in FIG. 3. As illustrated in FIG. 3, the process preferably starts with the input of the values for the initial shutoff weight indication, the upper and lower portion weight limits, and the shutoff weight moderating factor in step 60. This initial shutoff value corresponds to a certain percentage of the target portion weight and is selected to compensate for the reduction of the weight indication of the portion due to the partial support of the portion by the flowing dough mass in the supply line 10 prior to separation and to compensate for any residual dough flow after the closing signal is sent to the divider. Next, a control signal is sent to the drive motor 36 (step 62), which rotates the motor in the reverse direction sufficient to disengage the pegs 42 of the fork 40, which is connected to the drive motor 36, from the block 44, which is connected to the axle 46 of the drive roller 16 of the dividing station. This allows the empty weight of the rollers 16 and 22 to be stored as the baseline weight value (Wb) in step 64.

The process of dividing the dough portions begins with step 66 by the data processor 34 sending a control signal to open the divider to form the first dough portion 26 from the dough supply arriving from the supply line 10. When the initial portion of dough is formed on the roller receptacle, the analog weight indication from the strain gauge load cell is measured and converted by an analog to digital ("A/D") converter to a digital reading which can be processed by the weight signal processor (Step 68). As is known in the art, other methods of obtaining weight indications such as serial, current compensation, and ceramic capacitance may also be used. In step 68, the data processor 34 receives weight indications from the load cell 20 of the dividing station until the predetermined shutoff weight indication is reached. Once the weight of the dough portion formed upon the rollers of the dividing station as indicated by the weight signal processor 30 reaches or exceeds the shutoff weight, in step 70 the data processor 34 transmits a control signal to close the divider 14, thus stopping the flow of dough and releasing the formed portion 26 to the rollers 16 and 22.

In step 72 the final portion weight is determined by measuring the delay time following the closing of the divider before determining the portion weight indication. The predetermined delay time interval is preferably no greater than 0.7 second. A predetermined delay time interval of approximately 150 milliseconds may be of sufficient duration to obtain an accurate weight indication. In step 72, after the expiration of the delay time, the data processor 34 calculates and stores the weight of the separated portion 26 as the value "portion weight" by subtracting the baseline empty roller weight indication, Wb, from the indication received of the portion 26 supported by the rollers.

In step 74, the data processor 34 tests the portion weight value to ascertain whether it falls within the predetermined portion weight limits. If so, in step 78, the data processor 34 sends a control signal to motor to rotate the drive roller to release the dough portion to the conveyor.

Alternatively, if the indicated weight of the portion falls outside the tolerance range, in step 76 the data processor 34 adjusts the shutoff weight. In this step 76, the data processor 34 computes the Deviation between the portion weight and the desired portion weight and applies the Deviation, multiplied by the shutoff weight moderating factor, to the shutoff weight used to form subsequent portions. A Deviation that is less than zero (indicated weight is less than desired weight) indicates that the shutoff weight value is insufficient to produce portions of desired weight, and therefore, the shutoff weight value needs to be increased. Conversely, a Deviation that is greater than zero (average indicated weight exceeds desired weight) indicates that the shutoff weight value used to control the dough divider is excessive, thereby producing larger portions than desired, and therefore, the shutoff weight value needs to be decreased.

Next, in step 78, the data processor 34 sends a control signal to motor to rotate the drive roller to release the dough portion to the conveyor. Optionally, the data processor 34 may send an alternative control signal to motor to rotate the roller to propel the non-conforming dough portion to a different conveyor or location for corrective processing.

After step 78, the weight signal processor continues on to step 66 and subsequent to receive and evaluate the indicated weight of the next succeeding portion formed in the process.

Figure 4:
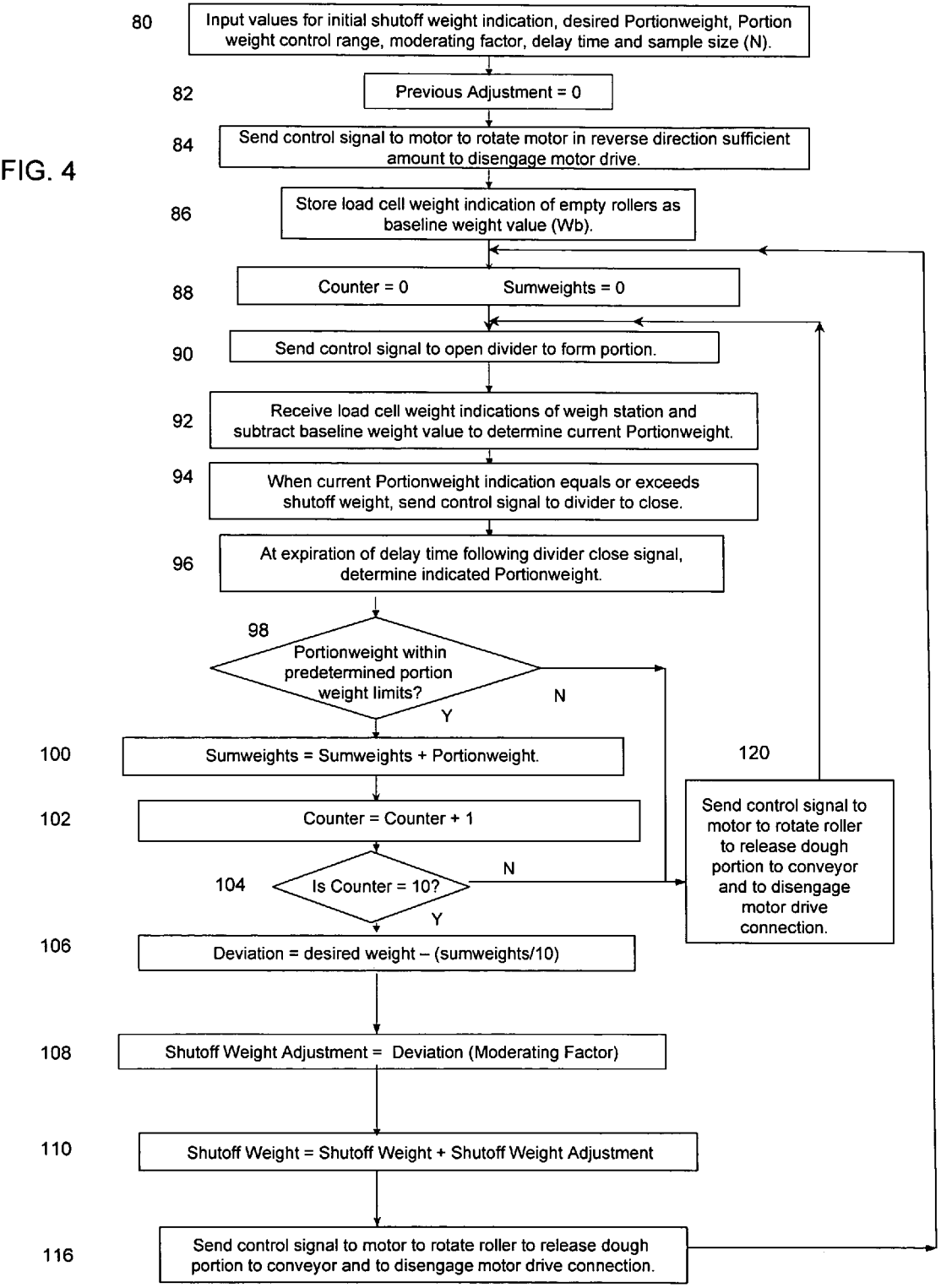
FIG. 4 is a flow chart diagram illustrating the operation of the weight signal processor of another preferred embodiment of the present invention.

The shutoff weight adjustment may also be determined from the weights of more than one portion, as shown in FIG. 4. As illustrated in FIG. 4, the process preferably starts with the input of the values for the initial shutoff weight indication, the upper and lower portion weight limits, and the shutoff weight correction factor in step 80. Next, the value of the Previous Adjustment is initialized at zero in step 82. Next, a control signal is sent to the drive motor 36 (step 84), which rotates the motor in the reverse direction sufficient to disengage the pegs 42 of the fork 40, which is connected to the drive motor 36, from the block 44, which is connected to the axle 46 of the drive roller 16 of the dividing station. This allows the empty weight of the rollers 16 and 22 to be stored as the baseline weight value (Wb) in step 86. The values of the sample size counter (Counter) register and the sum of the recorded weights for the current sample group (Sumweights) are initialized at zero in Step 88.

The process of dividing the dough portions then begins with step 90 with the data processor 34 sending a control signal to open the divider to form the first dough portion 26 from the dough supply arriving from the supply line 10. Next, in step 92, the data processor 34 receives weight indications from the load cell 20 of the dividing station until the predetermined shutoff weight indication is reached. Once the weight of the dough portion formed upon the rollers of the dividing station as indicated by the weight signal processor 30 reaches or exceeds the shutoff weight, the data processor 34 transmits a control signal to close the divider 14 in step 94, thus releasing the formed portion 26 to the rollers.

In step 96 the portion weight is determined by measuring the delay time following the closing of the divider, and then the data processor 34 calculates and stores the weight of the separated portion 26 as the value "portion weight" by subtracting the baseline empty roller weight indication, Wb from the indication received of the portion 26 supported by the rollers.

Next, the indicated portion weight is evaluated to determine if it falls within the pre-established portion weight control range, such as, for example, 25% above or below the desired weight (Step 98). If the indicated weight of the portion falls outside the control range, it is considered to be aberrant or unreliable data, and a control signal 34 is transmitted to the drive motor 36 (Step 120), to release that portion from the roller receptacle and to disengage the motor drive connection to prepare for the next portion in the dividing sequence to be formed on the roller receptacle (Step 90). Under this condition, the weight signal processor disregards the aberrant weight indication of the released portion and continues on to Step 90 and subsequent to read and evaluate the indicated weight of the next succeeding portion in the dividing process.

Alternatively, if the indicated weight is determined to fall within the control weight range (Step 98), the indicated Portionweight is added to the cumulative indicated portion weight register for the sample group (Sumweights) (Step 100). Next, the sample size counter (Counter) is incremented to reflect the inclusion of this indicated portion weight in the sample size counter (Counter) (Step 102).

At Step 104, the Counter is evaluated to determine if the indicated weights for each of a complete sample size of ten have been accumulated in the Sumweights register. If not, the process continues to Step 120 with the transmission of a control signal 34 to operate the motor to drive the roller to release the portion, and to operate the servo motor 36 to disengage the motor drive connection.

Conversely, if the Counter register is equal to ten, thus indicating that a cumulative indicated weight for the complete sample size of ten has been accrued, the program calculates an average weight deviation for the sample group (Deviation) (Step 106), which is the difference between the desired portion weight and the average indicated portion weight of the sample group. A Deviation that is less than zero (average indicated weight is less than desired weight) indicates that the shutoff weight value is insufficient to produce portions of desired weight, and therefore the shutoff weight value needs to be increased. Conversely, a Deviation that is greater than zero (average indicated weight exceeds desired weight) indicates that the shutoff weight value used to control the dough divider is excessive, thereby producing larger portions than desired, and therefore the shutoff weight value needs to be decreased.

In order to moderate the magnitude of corrections applied to the shutoff weight upon completion of each sample group weight analysis, a moderating factor, generally less than 1.0 and preferably approximately 0.4, may be applied to the Deviation to obtain the Shutoff Weight Adjustment (Step 108), which is ultimately applied to the shutoff weight currently used to control the divider, to determine the new shutoff weight (Step 110). As is apparent to one skilled in the art, the level of the moderation effect achieved by multiplying by the moderating factor can be tailored to achieve more or less substantial adjustments by varying the value of the moderating factor.

Figure 5:
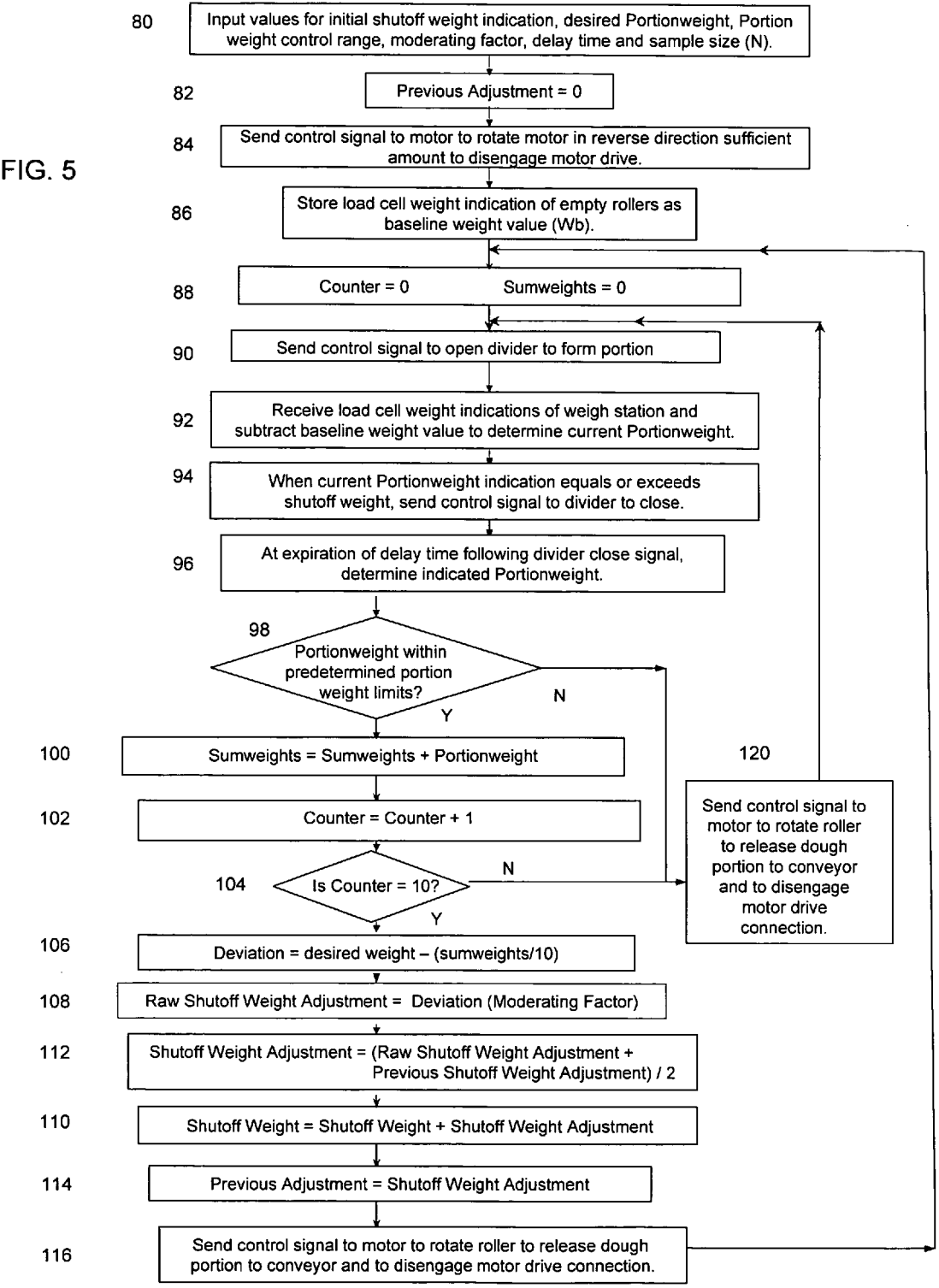
FIG. 5 is a flow chart diagram illustrating the operation of the weight signal processor of another preferred embodiment of the present invention.

Greater moderation of the magnitude of corrections applied to the shutoff weight value upon completion of each sample group may be achieved by averaging the shutoff weight adjustment for the current sample group (computed in Step 108) with the Previous shutoff weight Adjustment computed for the previous sample group to determine the actual Adjustment which is then applied to the shutoff weight value. This approach is depicted in FIG. 5, which is a flow chart illustrating the operation of the weight signal processor of another embodiment of the present invention. As illustrated in FIG. 5, steps 80 through 110 are essentially identical to the process described in FIG. 4.

As illustrated in FIG. 5, upon determination of the raw shutoff weight Adjustment for the current sample group (Step 108), it is averaged with the Previous shutoff weight adjustment computed for the previous sample group (Step 112) to determine the actual shutoff weight Adjustment applied to the existing shutoff weight value (Step 110) used to control the dough divider 14. Finally, in Step 114, the current shutoff weight Adjustment value is then stored in the Previous Adjustment register for calculation of the new actual Shutoff Weight Adjustment for the next sample group.

As is apparent to one skilled in the art, the moderation effect achieved by averaging the Raw Adjustment for the current sample group with the shutoff weight Adjustment computed for the previous sample can be further enhanced by including the shutoff weight Adjustments for two or more immediately preceding sample groups in the averaging calculation used to generate the actual shutoff weight Adjustment used to determine the new shutoff weight used to control the divider.

Although the subject invention has been described in use primarily with respect to bread dough, the invention is applicable to many other production processes involving controlled weight portions of semi-solid matter, including but not limited to agricultural and food products, polymers, plastics, resins, cellulose, gelatins, refractory products, ceramics and the like. Many changes, modifications, variations, combinations, subcombinations and other uses and applications of the subject invention will be and become apparent to those skilled in the art after considering this specification and the accompanying drawings, which disclose a preferred embodiment thereof. All such changes, modifications, variations, and other uses and applications that do not depart from the spirit and scope of the invention are deemed to be covered by the invention, which is to be limited only by the claims which follow.

What is claimed is:

1. A method of dividing semi-solid matter into portions comprising the steps of:
   providing a divider which opens and closes in response to control signals to separate the semi-solid matter into portions;
   providing a receptacle for receiving individual portions from the divider;
   mounting said receptacle to a load cell for producing electrical indications according to an applied load;

providing a motor which operates in response to a control signal;

connecting the motor to the receptacle with a disengageable connection which drives the receptacle when engaged, and provides a complete physical separation between the load cell and the motor when disengaged;

sending a control signal to the motor to disengage the connection;

sending an opening control signal to the divider to release semi-solid matter to the receptacle;

determining the weight of the matter on the receptacle from load cell indications;

sending a closing control signal to the divider to separate the semi-solid matter on the receptacle into a portion when the load cell indication reaches a predetermined shutoff weight; and sending a control signal to the motor to release the portion from the receptacle.

2. The method of claim 1 further comprising the steps of:
inputting a predetermined target weight;
determining the weight of the separated portion on the receptacle from load cell indications;
determining the difference between the weight of the portion and the predetermined target weight; and
adjusting the shutoff weight according to the difference.

3. The method of claim 2 further comprising the steps of:
inputting a predetermined delay time;
measuring the delay time following the sending of the closing control signal to the divider; and
determining the portion weight from a weight indication received after the expiration of the delay time.

4. The method of claim 3 further comprising the steps of:
defining predetermined weight limits for the portions;
determining whether the portion weight falls within predetermined limits; and
adjusting the shutoff weight according to the difference only if the portion weight falls within the predetermined limits.

5. The method of claim 1 further comprising the steps of:
storing a value of the load cell weight indication in an empty condition; and
determining the portion weight by subtracting the empty load cell indication from a weight indication received with the portion on the receptacle.

6. The method of claim 1 further comprising the steps of:
inputting a value for a sample size N;
determining an average portion weight of at least N portion weight indications;
determining the difference between the average weight of the N portions and the predetermined target weight; and
adjusting the shutoff weight according to the difference.

7. The method of claim 1 wherein said receptacle is rotatably mounted to the load cell.

8. The method of claim 1 wherein the receptacle comprises at least one roller.

9. A method of dividing semi-solid matter into portions comprising the steps of:
providing a divider which opens and closes in response to control signals to separate the semi-solid matter into portions;
providing a receptacle for receiving individual portions from the divider;
mounting said receptacle to a load cell for producing electrical indications according to an applied load;
providing a motor which operates in response to a control signal;
connecting the motor to the receptacle with a disengageable connection for driving the receptacle;
sending a control signal to the motor to disengage the connection;
sending an opening control signal to the divider to release semi-solid matter to the receptacle;
determining the weight of the matter on the receptacle from load cell indications;
sending a closing control signal to the divider to separate the semi-solid matter on the receptacle into a portion when the load cell indication reaches a predetermined shutoff weight;
sending a control signal to the motor to release the portion from the receptacle; weighing each portion in a group containing a predetermined number of portions;
determining the difference between the average weight of the portion and the predetermined target weight; and
adjusting the shutoff weight by the operating rate control signal by an amount equal to the average weight difference from the target weight multiplied by a predetermined moderating factor.

10. The method of claim 9 wherein the predetermined moderating factor is one.

11. The method of claim 9 wherein the predetermined moderating factor is a fractional number between zero and one.

12. The method of claim 9 wherein the group of a predetermined number of portions is limited to portions having a weight within a predetermined weight range.

13. The method of claim 12 where portions having a weight outside the predetermined weight range are identified.

14. The method of claim 9 wherein the predetermined weight range is approximately 75–125% of the predetermined target weight.

15. The method of claim 9 wherein the predetermined number of portions in the group is one.

16. The method of claim 9 wherein the predetermined time delay interval is between 0 and 1.0 seconds.

17. The method of claim 9 wherein the step of weighing each portion in a group containing a predetermined number of portions is performed by apparatus comprising a fluid restricted strain gauge load cell.

18. An apparatus for dividing portions of semi-solid matter comprising:
a load cell for producing electrical indications according to an applied load;
a receptacle rotatably mounted to said load cell for receiving individual portions;
a motor which operates in response to a control signal for driving the receptacle;
a disengageable connection between the motor and the receptacle which drives the receptacle when engaged and provides a complete physical separation between the load cell and the motor when disengaged;
a divider which operates in response to a control signal located in proximity to the receptacle to separate the semi-solid matter into portions on the receptacle;
a processor in electrical communication with the load cell, the divider and the motor, the processor programmed to receive electrical indications from the load cell for determining the weight of matter on the receptacle, and to send a control signal to the divider to separate the semi-solid matter on the receptacle into a portion when the load cell indication reaches a predetermined shutoff weight.

19. The apparatus of claim 18 wherein the processor is programmed to send a control signal to the motor to release the separated portion from the receptacle.

20. The apparatus of claim 18 further comprising an analog/digital converter.

21. The apparatus of claim 18 further comprising a dampening device mounted to the load cell.

22. An apparatus for dividing portions of semi-solid matter comprising:
- a load cell for producing electrical indications according to an applied load;
- a receptacle rotatably mounted to said load cell for receiving individual portions; the receptacle comprises at least one roller;
- a motor which operates in response to a control signal for driving the receptacle;
- a disengageable connection between the motor and the receptacle;
- a divider which operates in response to a control signal located in proximity to the receptacle to separate the semi-solid matter into portions on the receptacle;
- a processor in electrical communication with the load cell, the divider and the motor, the processor programmed to receive electrical indications from the load cell for determining the weight of matter on the receptacle, and to send a control signal to the divider to separate the semi-solid matter on the receptacle into a portion when the load cell indication reaches a predetermined shutoff weight.

* * * * *